(12) United States Patent
Isono et al.

(10) Patent No.: US 10,465,599 B2
(45) Date of Patent: Nov. 5, 2019

(54) TURBOCHARGER

(71) Applicant: IHI Corporation, Koto-ku (JP)

(72) Inventors: Yuusuke Isono, Tokyo (JP); Kiyomichi Ichikawa, Tokyo (JP); Atsushi Mori, Tokyo (JP); Yuji Kobayashi, Tokyo (JP); Kazuaki Iwata, Tokyo (JP)

(73) Assignee: IHI Corporation, Koto-ku (JP)

( * ) Notice: Subject to any disclaimer, the term of this patent is extended or adjusted under 35 U.S.C. 154(b) by 406 days.

(21) Appl. No.: 15/374,353

(22) Filed: Dec. 9, 2016

(65) Prior Publication Data

US 2017/0089256 A1    Mar. 30, 2017

Related U.S. Application Data

(63) Continuation of application No. PCT/JP2015/066759, filed on Jun. 10, 2015.

(30) Foreign Application Priority Data

Jun. 20, 2014  (JP) ................................. 2014-127137

(51) Int. Cl.
*F02B 37/18*    (2006.01)
*F01D 25/16*    (2006.01)

(52) U.S. Cl.
CPC ............ *F02B 37/186* (2013.01); *F01D 25/16* (2013.01); *F02B 37/183* (2013.01);
(Continued)

(58) Field of Classification Search
CPC ...... F02B 37/18; F02B 37/183; F02B 37/186; F01D 25/16; F05D 2220/40; F05D 2240/60; Y02T 10/44
(Continued)

(56) References Cited

U.S. PATENT DOCUMENTS 4,098,085 A * 7/1978 McDowell ............. F02B 37/18
                                            60/602
4,245,953 A * 1/1981 Milton ................... F02B 37/18
                                            60/602
(Continued)

FOREIGN PATENT DOCUMENTS

CN         102656351 A      9/2012
DE   102009007364 A1 *    8/2010   ............ F02B 37/186
(Continued)

OTHER PUBLICATIONS

Office Action dated Nov. 14, 2017 in Japanese Patent Application No. 2016-529275.
(Continued)

*Primary Examiner* — Thai Ba Trieu
(74) *Attorney, Agent, or Firm* — Oblon, McClelland, Maier & Neustadt, L.L.P.

(57) ABSTRACT

A turbocharger includes a bearing portion having an end as an inner end surface located within a turbine housing in a penetrating direction of a bearing hole; a shaft rotatably supported in the bearing hole, one end thereof located within the turbine housing and the other end thereof located outside the turbine housing; an attaching plate fixed to the shaft, including an inner facing surface facing the inner end surface in an axial direction of the shaft; and a valve coupled to the shaft via the attaching plate to open and close a flow path opened to an internal space of the turbine housing. An inner radial groove is formed in at least one of the inner end surface and the inner facing surface. The inner radial groove extends in the radial direction of the shaft to allow a part of an exhaust gas flowing within the turbine housing to flow therethrough.

9 Claims, 7 Drawing Sheets

(52) U.S. Cl.
CPC ...... *F05D 2220/40* (2013.01); *F05D 2240/60* (2013.01); *Y02T 10/144* (2013.01)

(58) Field of Classification Search
USPC .......................................................... 60/602
See application file for complete search history.

(56) References Cited

U.S. PATENT DOCUMENTS

| | | | | |
|---|---|---|---|---|
| 4,463,564 | A | * | 8/1984 | McInerney ........... F02B 37/183 60/602 |
| 6,310,414 | B1 | | 10/2001 | Agahi et al. |
| 8,844,282 | B2 | | 9/2014 | Jaegle et al. |
| 2005/0079049 | A1 | | 4/2005 | Ishihara et al. |
| 2012/0060495 | A1 | * | 3/2012 | Jacob ................... F01D 17/105 60/602 |
| 2012/0228833 | A1 | | 9/2012 | Delitz |
| 2013/0089411 | A1 | * | 4/2013 | Ward .................... F02B 37/186 415/151 |
| 2013/0287552 | A1 | * | 10/2013 | House ................... F02B 37/186 415/170.1 |
| 2014/0003908 | A1 | * | 1/2014 | House ................... F01D 11/025 415/1 |
| 2014/0144135 | A1 | * | 5/2014 | Gupta ................... F02B 37/186 60/602 |
| 2014/0165555 | A1 | * | 6/2014 | Marques ................ F02B 37/18 60/602 |
| 2017/0145908 | A1 | * | 5/2017 | Uneura ................... F02B 37/18 |
| 2017/0145909 | A1 | * | 5/2017 | Huh ........................ F02B 37/18 |
| 2018/0347452 | A1 | * | 12/2018 | Brady ................... F02B 37/186 |

FOREIGN PATENT DOCUMENTS

| | | |
|---|---|---|
| DE | 10 2011 076 587 A1 | 11/2012 |
| JP | 5-248253 | 9/1993 |
| JP | 8-334030 | 12/1996 |
| JP | 10-502145 | 2/1998 |
| JP | 2005-113797 | 4/2005 |
| JP | 2012-107560 A | 6/2012 |
| JP | 2013-512373 | 4/2013 |
| JP | 2013-130133 | 7/2013 |
| JP | 2013-155669 | 8/2013 |
| WO | WO 2005/008041 A1 | 1/2005 |
| WO | WO 2012/131997 A1 | 10/2012 |

OTHER PUBLICATIONS

International Search Report dated Aug. 11, 2015 in PCT/JP2015/066759, filed on Jun. 10, 2015 (with English Translation).
Written Opinion dated Aug. 11, 2015 in PCT/JP2015/066759, filed on Jun. 10, 2015.
Combined Chinese Office Action and Search Report dated Jun. 11, 2018 in Chinese Patent Application No. 201580032017.8, 5 pages.

* cited by examiner

TURBOCHARGER

CROSS REFERENCE TO RELATED APPLICATIONS

This application is a continuation application of International Application No. PCT/JP2015/066759, filed on Jun. 10, 2015, which claims priority to Japanese Patent Application No. 2014-127137, filed on Jun. 20, 2014, the entire contents of which are incorporated by reference herein.

BACKGROUND

1. Technical Field

The present disclosure relates to a turbocharger including a valve that opens and closes a flow path open to an internal space of a housing.

2. Description of the Related Art

Conventionally, there is known a turbocharger in which a rotation axis where a turbine wheel is provided at one end and a compressor wheel is provided at the other end is rotatably held in a bearing housing. Such a turbocharger is connected to an engine, the turbine wheel is rotated by an exhaust gas discharged from the engine and the compressor wheel is rotated by the rotation of the turbine wheel via the rotation axis. In this way, along with the rotation of compressor wheel, the turbocharger compresses air and feeds it out to the engine.

The turbocharger disclosed in Japanese Patent Application Laid-Open Publication (Translation of PCT Application) No. 2013-512373 (Patent Literature 1) includes a bypass flow path. A part of an exhaust gas guided to a turbine housing flows to the downstream of a turbine wheel through a bypass flow path without flowing through a turbine scroll flow path communicating with the turbine wheel. Namely, the part of the exhaust gas bypasses the turbine scroll flow path. In addition, the turbocharger includes a valve which opens and closes the bypass flow path. The valve is coupled to a shaft. The shaft is rotatably supported by a bearing portion. The bearing portion is attached to the turbine housing so as to penetrate the inside and outside of the turbine housing. When the shaft is rotated by the power of an actuator, the valve is operated together with the shaft, and thus the bypass flow path is opened and closed by the operation of the valve.

SUMMARY

In a case where a bearing portion penetrating between the inside and the outside of the housing of the turbocharger is provided as with the bearing portion for operating the valve, the shaft supported by the bearing portion is vibrated in the axial direction thereof due to the influence of exhaust pulsation or the like, with the result that a noise may be produced.

An object of the present disclosure is to provide a turbocharger which can suppress the vibration of a shaft that operates a valve and an abnormal noise caused by the vibration.

A first aspect of the present disclosure is a turbocharger including: a housing having an internal space formed therein; a bearing portion provided in the housing, the bearing portion being provided with a bearing hole penetrating between an inside and an outside of the housing, an end of the bearing portion in a penetrating direction of the bearing hole being formed as an inner end surface located within the housing; a shaft rotatably supported in the bearing hole, one end of the shaft being located within the housing and the other end of the shaft being located outside the housing; an attaching member including an inner facing surface facing the inner end surface of the bearing portion in an axial direction of the shaft, the attaching member being fixed to the shaft protruding from the bearing portion; and a valve coupled to the shaft through the attaching member, the valve configured to open and close a flow path opened to the internal space along with rotation of the shaft, wherein an inner radial groove is formed in one or both of the inner end surface and the inner facing surface, and the inner radial groove extends in a radial direction of the shaft to allow a part of a fluid flowing within the housing to flow therethrough.

The turbocharger may further include a link member configured to be swung around the shaft as a rotation axis by power of an actuator, the link member including an outer facing surface provided outside the housing, the outer facing surface being fixed to the shaft and facing an outer end surface of the bearing portion in the axial direction of the shaft, wherein the other end of the bearing portion in the penetrating direction of the bearing hole may be the outer end surface located outside the housing, and an outer radial groove may be formed in one or both of the outer end surface and the outer facing surface, the outer radial groove extends in the radial direction of the shaft to allow a part of the fluid flowing within the housing to flow therethrough.

A second aspect of the present disclosure is a turbocharger including: a housing having an internal space formed therein; a bearing portion provided in the housing, the bearing portion being provided with a bearing hole penetrating between an inside and an outside of the housing, an end of the bearing portion in a penetrating direction being formed as an outer end surface located outside the housing; a shaft rotatably supported in the bearing hole one end of the shaft being located outside the housing and the other end of the shaft being located within the housing; a valve coupled to the shaft, the valve configured to open and close a flow path opened to the internal space along with rotation of the shaft; and a link member configured to be swung around the shaft as a rotation axis by power of an actuator, the link member including an outer facing surface provided outside the housing, the outer facing surface being fixed to the shaft and facing the outer end surface of the bearing portion in the axial direction of the shaft, wherein an outer radial groove is formed in one or both of the outer end surface and the outer facing surface, the outer radial groove extends in the radial direction of the shaft to allow a part of a fluid flowing within the housing to flow therethrough.

The inner radial groove may be arranged, in a circumferential direction of the inner end surface, outside a contact range in which the shaft makes contact with an inner circumferential surface of the bearing hole by pressing force acting on the valve from the fluid flowing through the flow path.

The outer radial groove may be arranged, in a circumferential direction of the outer end surface, outside a contact range in which the shaft makes contact with the inner circumferential surface of the bearing hole by the power from the actuator acting on the link member.

According to the present disclosure, it becomes possible to suppress the vibration of a shaft that operates a valve and an abnormal noise caused by the vibration.

BRIEF DESCRIPTION OF THE DRAWINGS

FIG. 2A is a view when a discharge port of the turbine housing is seen from the front and FIG. 2B is a side view of the turbine housing.

FIG. 3A is a perspective view of the attaching plate, FIG. 3B is a side view of the attaching plate, and FIG. 3C is a top view of the attaching plate.

FIG. 6A is a cross-sectional view including the bearing portion and the center axis of the shaft in the vicinity of the bearing portion and FIG. 6B is a view when seen in the direction of an arrow VIB in FIG. 6A.

FIG. 8A is a cross-sectional view including the center axis of the bearing portion and FIG. 8B is a view when seen in the direction of an arrow VIIIB in FIG. 8A.

FIG. 9A is a cross-sectional view corresponding to FIG. 6A in the second modification, FIG. 9B is a view when seen in the direction of an arrow IVB of FIG. 9A in the link plate and FIG. 9C is a view when seen in the direction of an arrow IVC of FIG. 9A in the attaching plate.

DESCRIPTION OF THE EMBODIMENTS

An embodiment of the present disclosure will be described in detail below with reference to accompanying drawings. Dimensions, materials, specific values and the like indicated in the embodiment are simply examples for facilitating the understanding of the disclosure and do not limit the present disclosure unless otherwise particularly specified. Note that, in the present specification and drawings, the same symbols are attached to elements which have substantially the same functions and configurations, and thus the repeated descriptions thereof are omitted and elements which are not directly related to the present disclosure are not illustrated.

Figure 1:
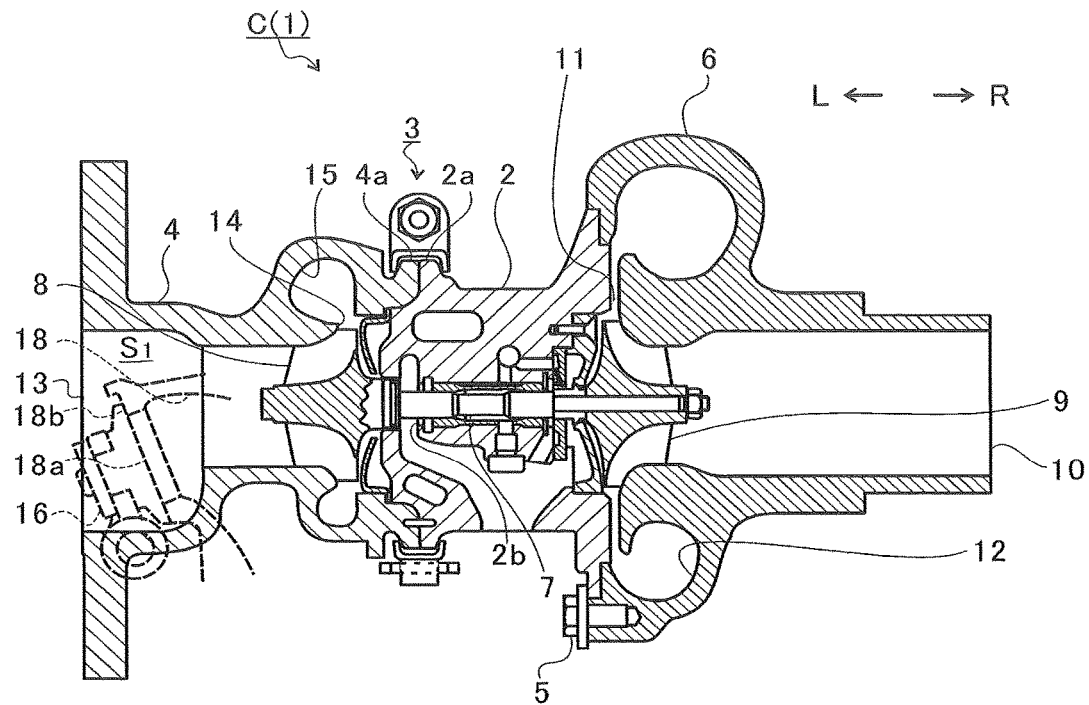
FIG. 1 is a schematic cross-sectional view of a turbocharger according to an embodiment of the present disclosure.

FIG. 1 is a schematic cross-sectional view of a turbocharger C. In the following description, it is assumed that an arrow L shown in FIG. 1 is a direction which indicates the left side of the turbocharger C and that an arrow R is a direction which indicates the right side of the turbocharger C. As shown in FIG. 1, the turbocharger C includes a turbocharger main body 1. The turbocharger main body 1 includes a bearing housing 2, a turbine housing 4 which is coupled to the left side of the bearing housing 2 through the use of a fastening mechanism 3 and a compressor housing 6 which is coupled to the right side of the bearing housing 2 through the use of a fastening bolt 5. They are integrally formed.

A protrusion 2a is provided on the outer circumferential surface of the bearing housing 2 in the vicinity of the turbine housing 4. The protrusion 2a protrudes in the radial direction of the bearing housing 2. Furthermore, a protrusion 4a is provided on the outer circumferential surface of the turbine housing 4 in the vicinity of the bearing housing 2. The protrusion 4a protrudes in the radial direction of the turbine housing 4. The bearing housing 2 and the turbine housing 4 are fixed by band-fastening the protrusions 2a and 4a through the use of the fastening mechanism 3. The fastening mechanism 3 is constituted of a fastening band (G coupling) which sandwiches the protrusions 2a and 4a.

A through-hole 2b is formed in the bearing housing 2. The through-hole 2b penetrates through the turbocharger C in the left/right direction. A rotation axis 7 is rotatably supported in the through-hole 2b. A turbine wheel 8 is integrally fixed to the left end portion of the rotation axis 7. The turbine wheel 8 is rotatably stored within the turbine housing 4. In addition, a compressor wheel 9 is integrally fixed to the right end portion of the rotation axis 7. The compressor wheel 9 is rotatably stored within the compressor housing 6.

A suction port 10 is formed in the compressor housing 6. The suction port 10 is open to the right side of the turbocharger C and is connected to an air cleaner (not shown). Furthermore, in a state where the bearing housing 2 and the compressor housing 6 are coupled to each other with the fastening bolt 5, facing surfaces of both the housings 2 and 6 form a diffuser flow path 11 which compresses air to raise the pressure thereof. The diffuser flow path 11 is formed in the shape of a ring from the inside to the outside of the rotation axis 7 (the compressor wheel 9) in the radial direction, and communicates with the suction port 10 via the compressor wheel 9, in the inside in the radial direction.

Moreover, the compressor housing 6 is provided with a compressor scroll flow path 12. The compressor scroll flow path 12 is annularly formed and is located on the outside of the rotation axis 7 (the compressor wheel 9) in the radial direction from the diffuser flow path 11. The compressor scroll flow path 12 communicates with a suction port (not shown) of an engine. In addition, the compressor scroll flow path 12 also communicates with the diffuser flow path 11. Therefore, when the compressor wheel 9 is rotated, air is sucked from the suction port 10 into the compressor housing 6, the pressure of the air is further raised in the diffuser flow path 11 and the compressor scroll flow path 12, and the resultant air is guided to the suction portion of the engine.

A discharge port 13 is formed in the turbine housing 4. The discharge port 13 is open to the left side of the turbocharger C and is connected to an exhaust gas purification device (not shown). The turbine housing 4 is provided with an internal space $S_1$ which includes the discharge port 13 as one end. In the internal space $S_1$, a valve 16 which will be described later is arranged. Furthermore, the turbine housing 4 is provided with an internal flow path 14 and a turbine scroll flow path 15 which is located on the outside of the rotation axis 7 (the turbine wheel 8) in the radial direction from this internal flow path 14 and which is annularly formed. The turbine scroll flow path 15 communicates with a gas inlet 17 (see FIG. 2B) to which an exhaust gas discharged from the exhaust manifold (not shown) of the engine is guided. In addition, the turbine scroll flow path 15 also communicates with the internal flow path 14. Therefore, the exhaust gas is guided from the gas inlet 17 to the turbine scroll flow path 15 and is guided to the discharge port 13 via the internal flow path 14, the turbine wheel 8 and the internal space $S_1$. In the series of circulation processes, the exhaust gas rotates the turbine wheel 8. In addition, the rotation force of the turbine wheel 8 is transmitted through the rotation axis 7 to the compressor wheel 9, and thus the compressor wheel 9 is rotated. The pressure of the exhaust gas is raised by the rotation force of the compressor wheel 9, and the exhaust gas is guided to the suction port of the engine.

Figure 2A:
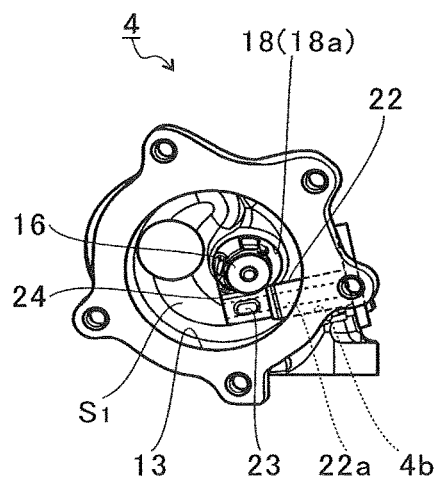
FIGS. 2A and 2B are external views of a turbine housing according to the embodiment of the present disclosure.
Figure 2B:
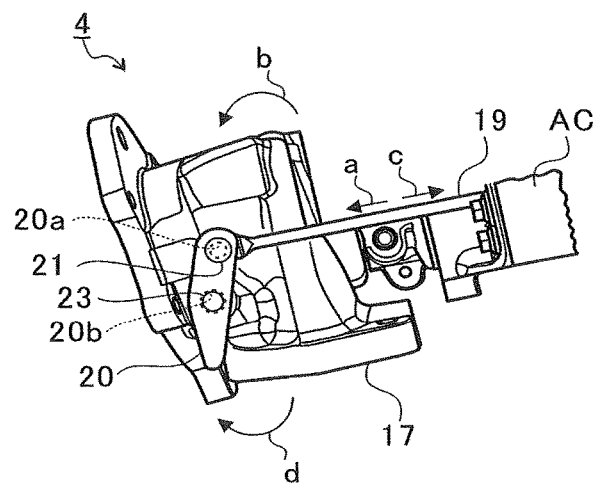

FIGS. 2A and 2B are external views of the turbine housing 4, FIG. 2A is a view when the discharge port 13 of the turbine housing 4 is seen from the front, and FIG. 2B is a side view of the turbine housing 4. In FIG. 2B, the gas inlet 17 is open substantially to the lower side of the turbine housing 4. The flow path communicating from the gas inlet 17 to the turbine scroll flow path 15 is branched on the upstream side with respect to the turbine scroll flow path 15. Furthermore, as shown in FIG. 1, the exit end 18a of a bypass flow path 18 (flow path) which is the branched flow path is formed on the wall surface of the turbine housing 4 which forms the internal space $S_1$.

A part of the exhaust gas flowing in from the gas inlet 17 can flow out, via the bypass flow path 18, into the internal space $S_1$ located downstream of the turbine wheel 8. Namely, the part of the exhaust gas can bypass the turbine scroll flow path 15.

The valve 16 is a valve member whose outer diameter is larger than the inside diameter of the exit end 18a. The valve 16 makes contact with a sheet surface 18b formed around the exit end 18a of the bypass flow path 18 to thereby close the bypass flow path 18. Furthermore, the valve 16 separates from the sheet surface 18b to thereby open the bypass flow path 18.

An actuator rod 19 shown in FIG. 2B is arranged outside the turbine housing 4, and one end thereof is fixed to an actuator AC, and the actuator rod 19 is operated in the axial direction by the power of the actuator AC. A pin rod 21 is fixed to the other end of the actuator rod 19. The pin rod 21 protrudes in a direction orthogonal to the axial direction of the actuator rod 19.

A link plate 20 (link member) is a plate member, and is provided outside the turbine housing 4. A link hole 20a is formed atone end of the link plate 20. The pin rod 21 is rotatably inserted into the link hole 20a in a state where the pin rod 21 is fixed to the actuator rod 19.

Therefore, when the actuator rod 19 operates in a direction indicated by an arrow "a" in FIG. 2B, the link plate 20 is swung in a direction indicated by an arrow "b" in FIG. 2B, whereas when the actuator rod 19 operates in a direction indicated by an arrow "c" in FIG. 2B, the link plate 20 is swung in a direction of an arrow "d" in FIG. 2B.

Furthermore, as shown in FIG. 2A, a housing hole 4b is formed in the turbine housing 4. The housing hole 4b penetrates between the outside of the turbine housing 4 on the side of the actuator rod 19 and the internal space $S_1$ of the turbine housing 4. In addition, a bearing portion 22 is press-fitted into the housing hole 4b.

The bearing portion 22 is constituted of a cylindrical member, and has a bearing hole 22a penetrating from one end to the other end thereof. A shaft 23 is inserted into the bearing hole 22a. Furthermore, the one end of the bearing portion 22 protrudes from the inner wall of the turbine housing 4 facing the internal space $S_1$. The other end of the bearing portion 22 protrudes to the outside of the turbine housing 4.

As described above, the one end of the bearing portion 22 protrudes into the internal space $S_1$ of the turbine housing 4, and the other end of the bearing portion 22 protrudes to the outside of the turbine housing 4, and thus the bearing hole 22a of the bearing portion 22 penetrates between the inside and the outside of the turbine housing 4.

In a state where one end of the shaft 23 protrudes more to the side of the internal space $S_1$ of the turbine housing 4 than the bearing portion 22, the shaft 23 is rotatably supported in the bearing hole 22a. Furthermore, the other end of the shaft 23 protrudes more to the outside of the turbine housing 4 than the bearing portion 22. In a state where the other end of the shaft 23 is inserted into a fixing hole 20b provided in the vicinity of the center of the link plate 20, the other end of the shaft 23 is welded to the link plate 20.

An attaching plate (attaching member) 24 is constituted of a plate member, and couples the valve 16 and the shaft 23 together. The valve 16 is provided on the side of one end of the attaching plate 24. The side of the other end of the attaching plate 24 is welded to the shaft 23. A coupling structure of the attaching plate 24 and the valve 16, and the shaft 23 will be described in detail later.

The valve 16 and the shaft 23 coupled by the attaching plate 24 are integrally rotated with each other in the rotation direction of the shaft 23. Consequently, when the actuator rod 19 operates in the axial direction (the direction of the arrows "a" and "c" in FIG. 2B), the link plate 20 is swung around the shaft 23 as a rotation axis (the direction of the arrows "b" and "d" in FIG. 2B). Namely, the link plate 20 is swung by the power of the actuator AC around the shaft 23 as a rotation axis. Then, the shaft 23 is rotated along with the swing of the link plate 20, and the valve 16 opens and closes the exit end 18a of the bypass flow path 18 by rotation of the shaft 23.

Figure 3A:
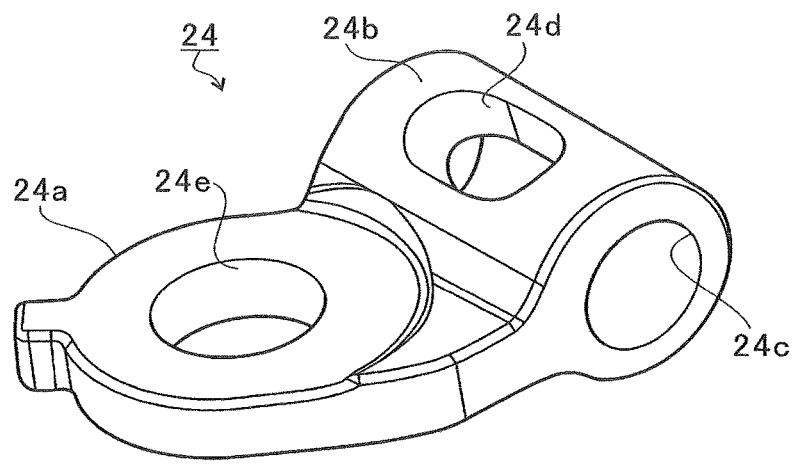
FIGS. 3A to 3C are explanatory views for illustrating an attaching plate according to the embodiment of the present disclosure.
Figure 3B:
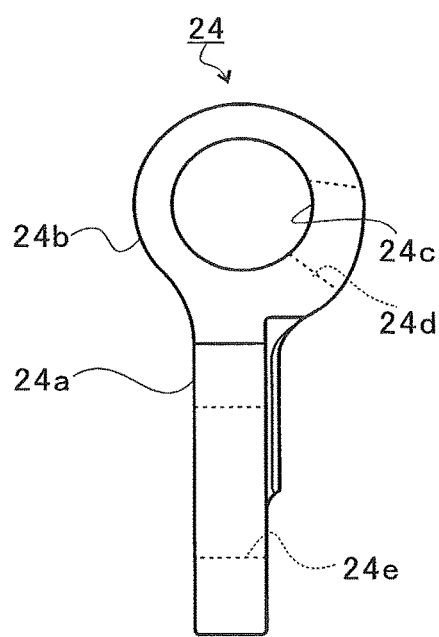
Figure 3C:
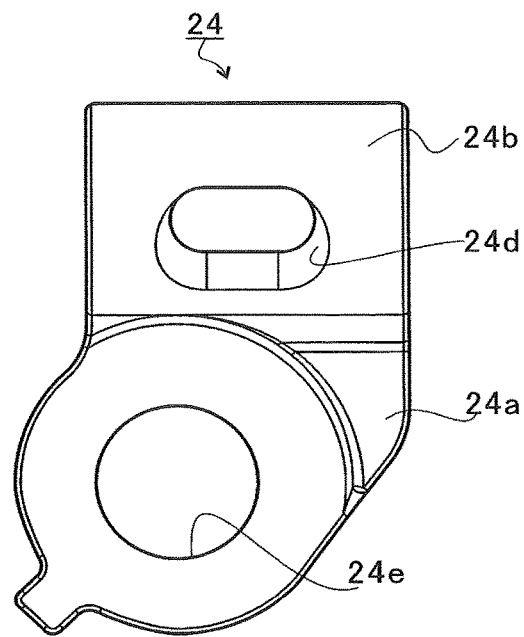

FIGS. 3A to 3C are explanatory views for illustrating the attaching plate 24, FIG. 3A is a perspective view of the attaching plate 24, FIG. 3B is a side view of the attaching plate 24, and FIG. 3C is a top view of the attaching plate 24.

As shown in FIGS. 3A to 3C, the attaching plate 24 includes a main body portion 24a and a cylinder portion 24b which is formed into a cylindrical shape at one end of the main body portion 24a. The cylinder portion 24b is provided with an insertion hole 24c into which the shaft 23 is inserted. In the cylinder portion 24b, an exposure hole 24d penetrating in the radial direction of the insertion hole 24c is formed. When the shaft 23 is inserted into the insertion hole 24c, a part of the shaft 23 is exposed via the exposure hole 24d. Then, in a state where the shaft 23 is inserted into the insertion hole 24c, the cylinder portion 24b of the attaching plate 24 is welded to the shaft 23 via the exposure hole 24d.

Furthermore, the main body portion 24a of the attaching plate 24 is provided with the main body hole 24e. The main body hole 24e penetrates the main body portion 24a in a direction orthogonal to the direction of the center axis of the insertion hole 24c. The attaching plate 24 and the valve 16 are coupled to each other via the main body hole 24e.

Figure 4:
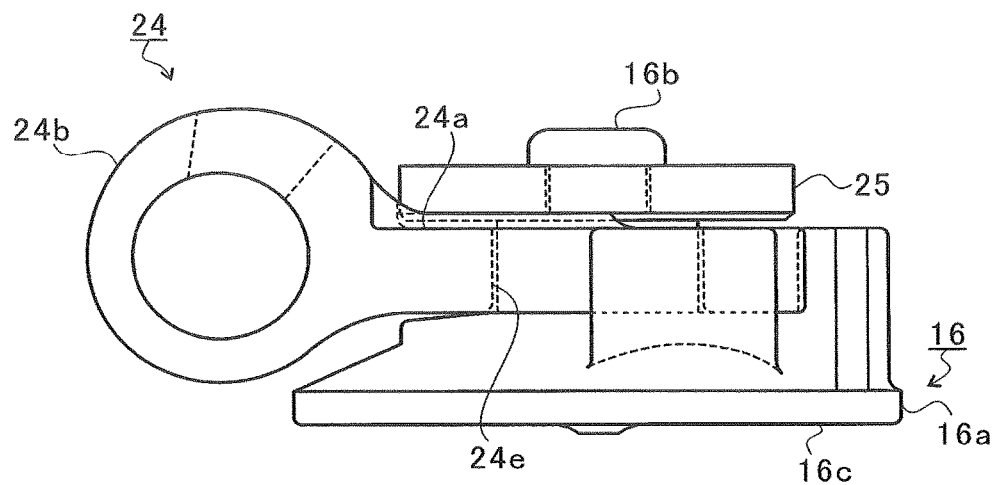
FIG. 4 is an explanatory view for illustrating the coupling structure of a valve to the attaching plate in the embodiment of the present disclosure.

FIG. 4 is an explanatory view for illustrating the coupling structure of the valve 16 to the attaching plate 24, and is a view when the attaching plate 24 is seen from the side surface in a state where the attaching plate 24 and the valve 16 are coupled to each other. As shown in FIG. 4, a protrusion portion 16b is formed on the main body portion 16a of the valve 16. The protrusion portion 16b protrudes from the opposite side of a contact surface 16c making contact with the sheet surface 18b (see FIG. 1), in a direction orthogonal to the surface direction of the contact surface 16c. Note that the protrusion portion 16b may be formed integrally with the main body portion 16a, or the protrusion portion 16b which is a separate member may be fixed to the main body portion 16a by welding or the like.

In a state where the main body portion 24a of the attaching plate 24 is sandwiched between the main body portion 16a of the valve 16 and a washer 25, the protrusion portion 16b of the valve 16 is inserted into the main body hole 24e of the attaching plate 24 and the washer 25, and the attaching plate 24 and the valve 16 are coupled to each other by pressurizing, deforming and swaging the tip end of the protrusion portion 16b protruding from the washer 25.

Figure 5:
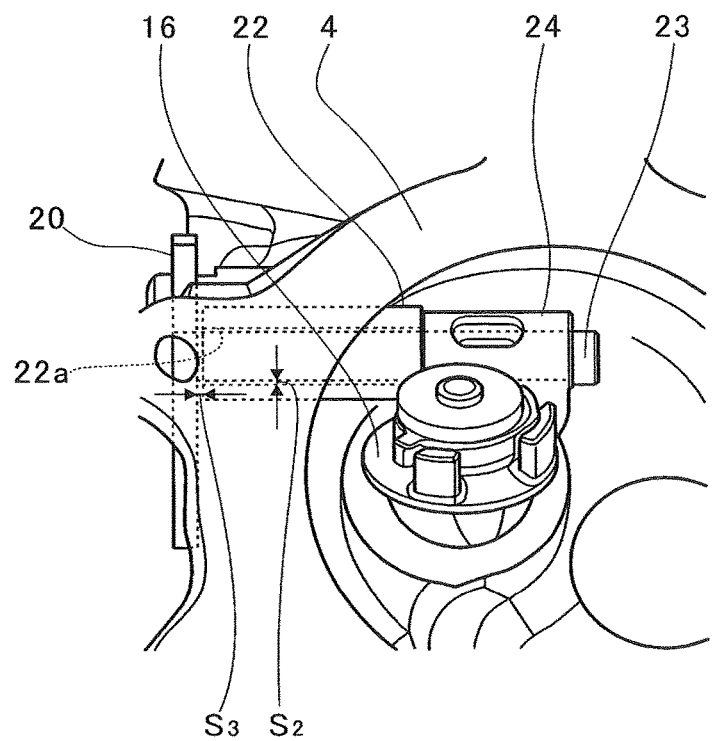
FIG. 5 is a perspective view of the turbine housing to which a shaft, the valve and the attaching plate are assembled in the embodiment of the present disclosure.

FIG. 5 is a perspective view of the turbine housing 4 to which the shaft 23, the valve 16 and the attaching plate 24 are assembled. As shown in FIG. 5, in order not to inhibit the rotation around an axis of the shaft 23 and the movement along the axis, a gap $S_2$ (backlash) in the radial direction of the shaft 23 is formed between the shaft 23 and the bearing hole 22a of the bearing portion 22, and a gap $S_3$ (backlash) in the axial direction of the shaft 23 is formed between the link plate 20 and the bearing portion 22. Therefore, the shaft 23 may be vibrated in the axial direction due to the influence of exhaust pulsation or the like. Accordingly, the bearing portion 22 of the present embodiment has a structure for suppressing such vibration.

Figure 6A:
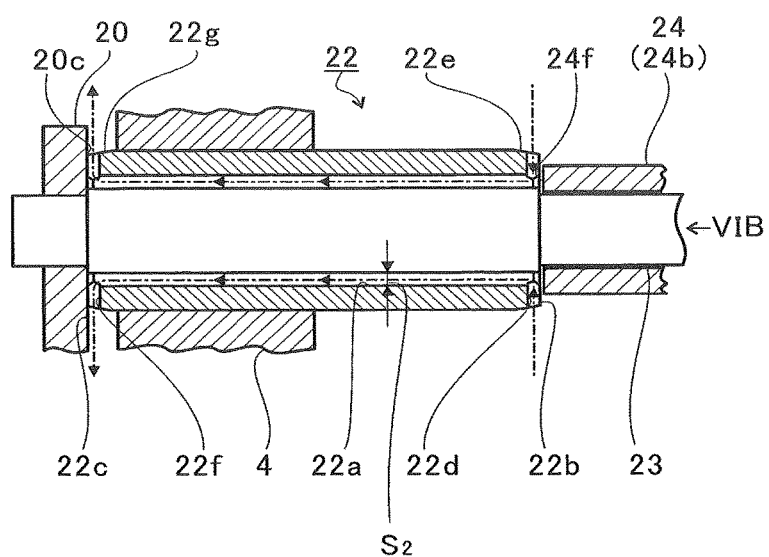
FIGS. 6A and 6B are explanatory views for illustrating the configuration of a bearing portion according to the embodiment of the present disclosure.
Figure 6B:
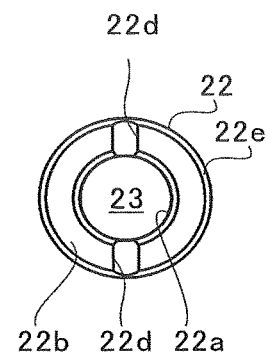

FIGS. 6A and 6B are explanatory views for illustrating the configuration of the bearing portion 22, FIG. 6A shows a cross-sectional view including the bearing portion 22 and the center axis of the shaft 23 in the vicinity of the bearing portion 22 and FIG. 6B is a view when seen in the direction of an arrow VIB in FIG. 6A. However, for ease of understanding, in FIG. 6B, only the bearing portion 22 and the shaft 23 are extracted and shown.

As shown in FIGS. 6A and 6B, the bearing portion 22 has an end surface on the side of one end in the penetrating direction of the bearing hole 22a, and the end surface is located within the turbine housing 4. Hereinafter, the end surface is referred to as an inner end surface 22b. In addition, the bearing portion 22 also has an end surface on the side of the other end in the penetrating direction of the bearing hole 22a, and the end surface is located outside the turbine housing 4. Hereinafter, the end surface is referred to as an outer end surface 22c.

The bearing portion 22 is sandwiched between the attaching plate 24 and the link plate 20 from both sides in the penetrating direction of the bearing hole 22a (the axial direction of the shaft 23). The cylinder portion 24b of the attaching plate 24 has an end surface (inner facing surface) 24f on the side of the bearing portion 22. The inner facing surface 24f faces the inner end surface 22b of the bearing portion 22 in the axial direction of the shaft 23. Furthermore, the link plate 20 has an end surface (outer facing surface) 20c on the side of the bearing portion 22. The outer facing surface 20c faces the outer end surface 22c of the bearing portion 22 in the axial direction of the shaft 23.

The length of the bearing portion 22 in the penetrating direction of the bearing hole 22a is shorter than an interval between the inner facing surface 24f of the attaching plate 24 and the outer facing surface 20c of the link plate 20. Accordingly, a gap $S_3$ (backlash) shown in FIG. 5 is formed.

The exhaust gas flows in the bearing hole 22a through a gap between the inner end surface 22b and the inner facing surface 24fa, by a pressure difference between the inside and the outside of the turbine housing 4. Furthermore, the exhaust gas flows to the side of the outer end surface 22c through the gap $S_2$ between the bearing hole 22a and the shaft 23. Then, a minute amount of exhaust gas is leaked to the outside through a gap between the outer end surface 22c and the outer facing surface 20c.

At this time, when the shaft 23 is moved in the axial direction due to the influence of exhaust pulsation or the like, the inner facing surface 24f collides with the inner end surface 22b to thereby receive a reaction force from the inner end surface 22b, and the outer facing surface 20c collides with the outer end surface 22c to thereby receive a reaction force from the outer end surface 22c. Accordingly, the attaching plate 24 and the link plate 20 are vibrated together with the shaft 23, and thus a noise may be generated.

Accordingly, an inner radial groove 22d is formed in the inner end surface 22b. The inner radial groove 22d is a groove extending from a position on the outer circumferential surface (here, a taper surface 22e formed on the side of the inner end surface 22b on the outer circumferential surface of the bearing portion 22) of the bearing portion 22 in the radial direction of the shaft 23 to a position of the bearing hole 22a in the radial direction of the shaft 23. In the embodiment, the shape of the inner radial groove 22d is linear when the inner end surface 22b is located on the front. However, when the inner end surface 22b is located on the front, the shape of the inner radial groove 22d is not limited to the linear shape and any shape may be adopted.

In the same way, an outer radial groove 22f is formed in the outer end surface 22c. The outer radial groove 22f is a groove extending from a position on the outer circumferential surface (here, a taper surface 22g formed on the side of the outer end surface 22c on the outer circumferential surface of the bearing portion 22) of the bearing portion 22 in the radial direction of the shaft 23 to a position of the bearing hole 22a in the radial direction of the shaft 23. In the embodiment, the shape of the outer radial groove 22f is linear when the outer end surface 22c is located on the front. However, when the outer end surface 22c is located on the front, the shape of the outer radial groove 22f is not limited to the linear shape and any shape may be adopted.

As shown in FIG. 6B, in the present embodiment, the two inner radial grooves 22d and the two outer end surfaces 22c are provided in the bearing portion 22. The inner radial grooves 22d are provided such that the phases with the center axis of the bearing portion 22 in the center are displaced from each other by 180 degrees. The outer end surface 22c has substantially the same shape as that of the inner end surface 22b, and thus illustration is omitted, but the two outer radial grooves 22f are also provided such that the phases with the center axis of the bearing portion 22 in the center are displaced from each other by 180 degrees.

Furthermore, each of the cross-sectional areas of the inner radial groove 22d and the outer radial groove 22f in a direction perpendicular to the radial direction is larger than the cross-sectional area of the gap $S_2$ in the radial direction of the shaft 23 (that is, the cross-sectional area in a direction perpendicular to the axial direction of the shaft 23).

As described above, a part of the exhaust gas flowing within the turbine housing 4 can stably flow through the inner radial groove 22d, by provision of the inner radial groove 22d. Consequently, the speed at which the inner facing surface 24f of the attaching plate 24 is moved to the inner end surface 22b can be reduced, by the pressure of the exhaust gas flowing through the inner radial groove 22d toward the bearing hole 22a (the inside in the radial direction). Furthermore, an impact caused by the collision of the inner facing surface 24f with the inner end surface 22b is buffered, the reaction force acting from the inner end surface 22b to the inner facing surface 24f is reduced and the vibration of the shaft 23 is suppressed.

In the same way, a part of the exhaust gas flowing within the turbine housing 4 can stably flow through the outer radial groove 22f, by provision of the outer radial groove 22f. Consequently, the speed at which the outer facing surface 20c of the link plate 20 is moved to the outer end surface 22c can be reduced, by the pressure of the exhaust gas flowing through the outer radial groove 22f from the bearing hole 22a to the outside in the radial direction. Furthermore, an impact caused by the collision of the outer facing surface 20c with the outer end surface 22c is buffered, the reaction force acting from the outer end surface 22c to the outer facing surface 20c is reduced and the vibration of the shaft 23 is suppressed.

Figure 7A:
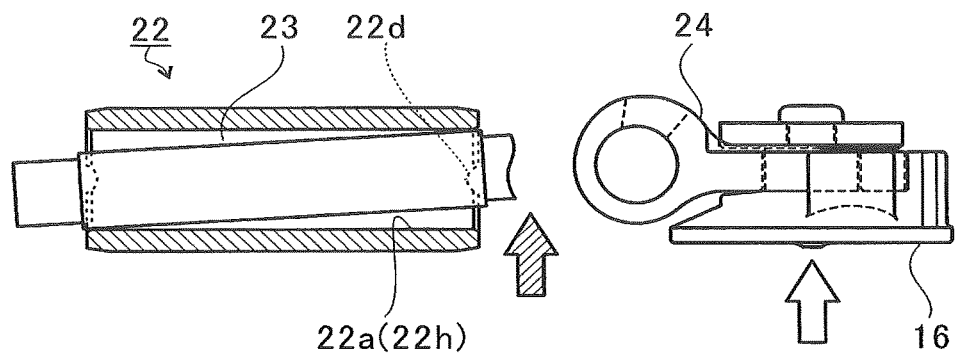
FIGS. 7A to 7C are explanatory views for illustrating the inclination of the shaft with respect to the bearing portion.
Figure 7B:
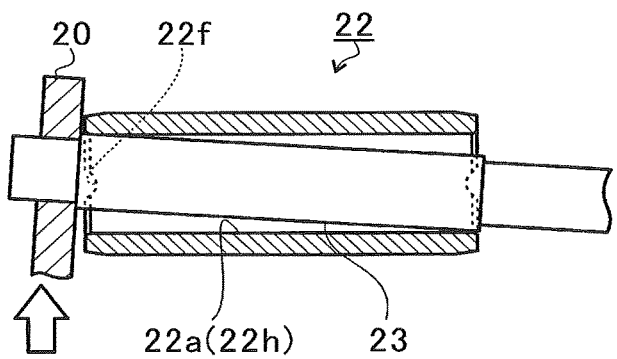
Figure 7C:
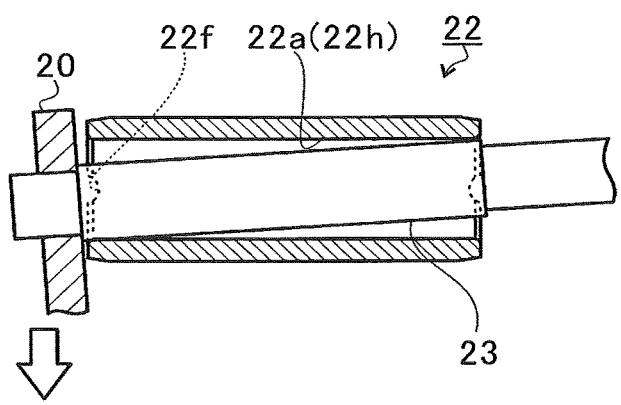

FIGS. 7A to 7C are explanatory views for illustrating the inclination of the shaft 23 with respect to the bearing portion 22. For ease of understanding, in FIG. 7A, the cross sections of the bearing portion 22 are aligned, and a side view of the valve 16 is shown with the mutual relative directions being substantially equal to a state of incorporation into the turbocharger C. In addition, in FIG. 7A, the coupling portion of the shaft 23 to the attaching plate 24 is not illustrated.

The valve 16 receives the pressure of the exhaust gas flowing through the bypass flow path 18. Namely, a pressing force acts on the valve 16 in a direction indicated by a white-solid arrow in FIG. 7A. Consequently, the pressing force acts on the shaft 23 in a direction indicated by a hatched arrow in FIG. 7A. Then, the side of the attaching plate 24 in the shaft 23 makes contact with a portion of the inner circumferential surface 22h of the bearing hole 22a on the upper side of FIG. 7A.

At this time, as indicated by broken lines in FIG. 7A, the inner radial groove 22d is arranged in a position in which the phase is displaced by approximately 90 degrees in the circumferential direction of the shaft 23 from the portion of the inner circumferential surface 22h with which the shaft 23 makes contact. Furthermore, the inner radial groove 22d is also arranged in a position in which the phase is displaced by approximately 180 degrees from the position of the inner radial groove 22d shown in FIG. 7A, in the circumferential direction of the shaft 23.

Namely, in the inner end surface 22b, the inner radial groove 22d is arranged outside the range in which the shaft 23 makes contact with the inner circumferential surface 22h of the bearing hole 22a by the pressing force acting on the valve 16 from the exhaust gas (fluid) flowing through the bypass flow path 18.

Accordingly, even when the inner radial groove 22d is provided without making contact of the shaft 23 with the inner radial groove 22d, it is possible to suppress an influence on wear caused by contact with the shaft 23 and the bearing portion 22.

Furthermore, when the link plate 20 is pressed by the actuator AC in the direction indicated by the arrow "a" in FIG. 2B, the link plate 20 is pressed in a direction indicated by a white-solid arrow in FIG. 7B. The shaft 23 is pressed together with the link plate 20. The side of the link plate 20 in the shaft 23 makes contact with a portion of the inner circumferential surface 22h of the bearing hole 22a on the upper side of FIG. 7B.

In the same way, when the link plate 20 is pressed by the actuator AC in the direction indicated by the arrow "c" in FIG. 2B, the link plate 20 is pressed in a direction indicated by a white-solid arrow in FIG. 7C. The shaft 23 is pressed together with the link plate 20, and the side of the link plate 20 in the shaft 23 inserted into the bearing hole 22a of the bearing portion 22 makes contact with a portion of the inner circumferential surface 22h of the bearing hole 22a on the lower side of FIG. 7C.

At this time, as indicated by broken lines in FIGS. 7B and 7C, the outer radial groove 22f is arranged in a position in which the phase is displaced by approximately 90 degrees in the circumferential direction of the shaft 23 from the portion of the inner circumferential surface 22h with which the shaft 23 makes contact. Furthermore, the outer radial groove 22f is also arranged in a position in which the phase is displaced by approximately 180 degrees from the position of the outer radial groove 22f shown in FIGS. 7B and 7C, in the circumferential direction of the shaft 23.

Namely, the outer radial groove 22f is arranged, in the circumferential direction of the outer end surface 22c, outside the contact range in which the shaft 23 makes contact with the inner circumferential surface 22h of the bearing hole 22a by the power from the actuator AC acting on the link plate 20.

Accordingly, even when the outer radial groove 22f is provided without making contact of the shaft 23 with the outer radial groove 22f, it is possible to suppress influence on wear caused by contact with the shaft 23 and the bearing portion 22.

Figure 8A:
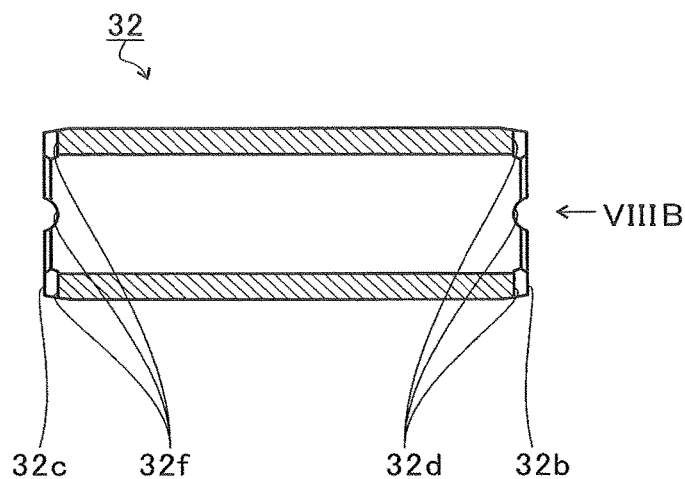
FIGS. 8A and 8B are explanatory views for illustrating a bearing portion according to a first modification of the embodiment of the present disclosure.
Figure 8B:
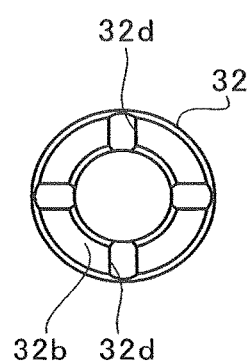

FIGS. 8A and 8B are explanatory views for illustrating a bearing portion 32 according to a first modification, FIG. 8A shows a cross-sectional view including the center axis of the bearing portion 32, and FIG. 8B shows a view when seen in the direction of an arrow VIIIB in FIG. 8A.

As shown in FIGS. 8A and 8B, in the first modification, four inner radial grooves 32d in which the phases are displaced from each other by 90 degrees are provided. Furthermore, an outer end surface 32c has substantially the same shape as that of an inner end surface 32b, and thus illustration is omitted here, but four outer radial grooves 32f in which the phases are displaced from each other by 90 degrees are provided.

As described above, each of the number of inner radial grooves 32d and the number of outer radial grooves 32f may be four, respectively. Even in this case, the vibration of the shaft 23 is reduced as in the embodiment described above.

Figure 9A:
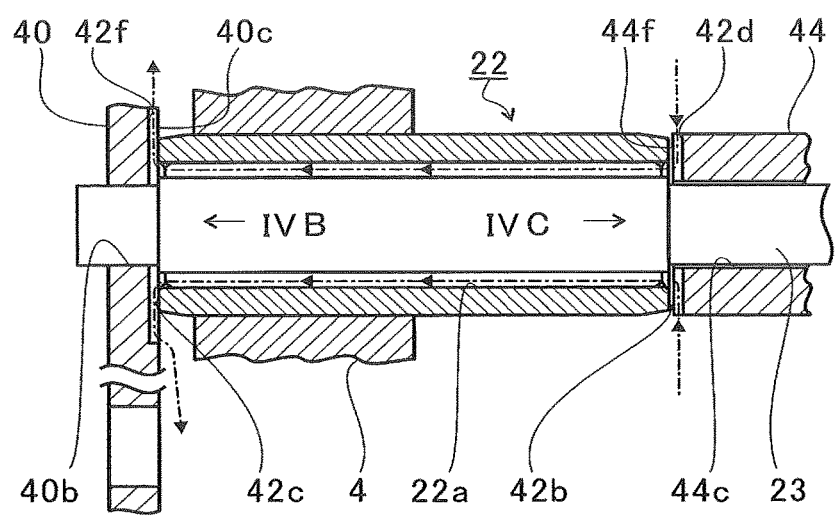
FIGS. 9A to 9C are explanatory views for illustrating a link plate and an attaching plate according to a second modification of the embodiment of the present disclosure.
Figure 9B:
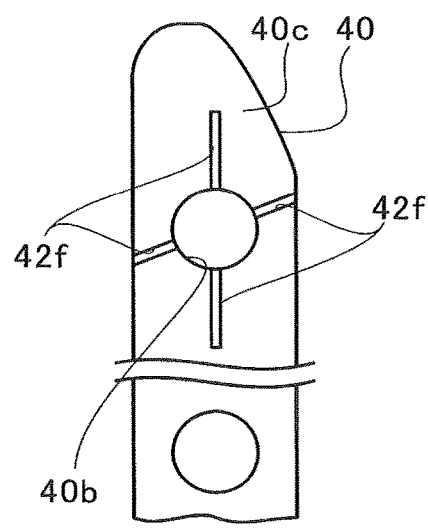
Figure 9C:
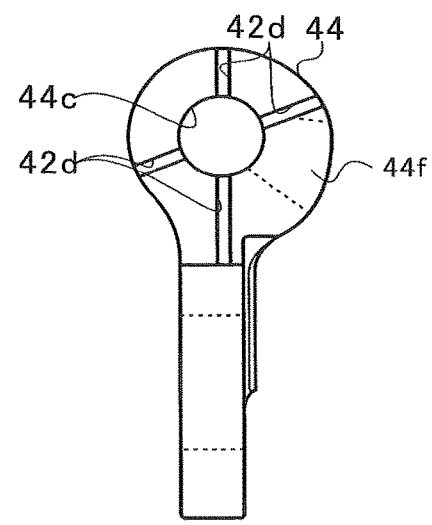

FIGS. 9A to 9C are explanatory views for illustrating a link plate 40 and an attaching plate 44 according to a second modification, FIG. 9A is a cross-sectional view corresponding to FIG. 6A in the second modification, FIG. 9B is a view when seen in the direction of an arrow IVB of FIG. 9A in the link plate 40, and FIG. 9C is a view when seen in the direction of an arrow IVC of FIG. 9A in the attaching plate 44.

As shown in FIGS. 9A and 9B, outer radial grooves 42f are formed in the outer facing surface 40c of the link plate 40. Here, the outer radial grooves 42f extend to a fixing hole 40b, inside the shaft 23 in the radial direction. In addition, the outer radial grooves 42f also extend to at least the position of the outer circumferential surface of the bearing portion 22 in the radial direction of the shaft 23, outside the shaft 23 in the radial direction.

As in the embodiment described above, a part of the exhaust gas flowing within the turbine housing 4 can stably flow through the outer radial groove 42f, by provision of the outer radial groove 42f, and the speed at which the outer facing surface 40c of the link plate 40 is moved to the outer end surface 42c can be reduced, by the pressure of the exhaust gas flowing through the outer radial groove 42f from the bearing hole 22a to the outside in the radial direction As shown in FIGS. 9A and 9C, an inner radial groove 42d is formed in an inner facing surface 44f of the attaching plate 44. Here, the inner radial groove 42d extends to an insertion hole 44c inside the shaft 23 in the radial direction. In addition, the inner radial groove 42d extends to the position of the outer circumferential surface of the bearing portion 22 in the radial direction of the shaft 23 outside the shaft 23 in the radial direction.

As described above, in the same way as in the aforementioned embodiment, a part of the exhaust gas flowing within the turbine housing 4 can stably flow through the inner radial groove 42d, by provision of the inner radial groove 42d, and the speed at which the inner facing surface 44f of the attaching plate 44 is moved to the inner end surface 42b can be reduced, by the pressure of the exhaust gas flowing through the inner radial groove 42d toward the bearing hole 22a (the inside in the radial direction).

As described above, the inner radial grooves 42d and the outer radial grooves 42f may be respectively formed in the inner facing surface 44f of the attaching plate 44 and the outer facing surface 40c of the link plate 40.

At this time, as shown in FIGS. 9B and 9C, the inner radial grooves 42d and the outer radial grooves 42f are individually arranged at irregular pitches in the circumferential direction of the shaft 23. Namely, the inner radial grooves 42d and the outer radial grooves 42f are individually arranged such that at least one pair differs from another pair in a distance between the pairs in the circumferential direction of the shaft 23. In particular, the inner radial grooves 42d are arranged at irregular pitches, and thus the outer circumferential surface of the shaft 23 is pressed onto the inner circumferential surface of the bearing portion 22 by the pressure of the exhaust gas flowing in from the inner radial grooves 42d, and the vibration of the shaft 23 in the axial direction is suppressed by the resulting frictional force. In this way, it is possible to suppress the vibration of the shaft 23 and an abnormal noise caused by the vibration.

In the embodiment and the modifications described above, there have been described the bearing portion 22, 32 for operating the valve 16 which opens and closes the exit end 18a of the bypass flow path 18. However, the bearing portion 22, 32 may be applied to a member for supporting another shaft as long as the bearing hole 22a penetrates between the inside and the outside of the housing in the turbocharger C.

Specifically, for example, the bearing portion of a shaft for opening and closing a bypass flow path which bypasses an intake flow path provided in the compressor housing 6 may be applied.

In addition, when a turbocharger is a twin scroll-type turbocharger, the bearing portion of a shaft for adjusting the flow rate of exhaust gas flowing into one turbine scroll flow path and the flow rate of exhaust gas flowing into the other turbine scroll flow path may be applied.

Furthermore, when one turbocharger constitutes either a series-type multi-stage turbocharger in which a low-pressure-stage turbocharger and a high-pressure-stage turbocharger are connected in series to the exhaust manifold of the engine or a parallel-type multi-stage turbocharger in which a plurality of turbochargers is connected in parallel to the exhaust manifold of the engine, the bearing portion of a shaft for adjusting the flow rate of exhaust gas flowing into the turbine housing of the turbocharger may be applied.

Moreover, in the embodiment and the first modification described above, the inner radial groove 22d, 32d and the outer radial groove 22f, 32f are arranged in an even number, respectively, at regular pitches in the circumferential direction of the shaft 23. However, the inner radial groove 22d, 32d and the outer radial groove 22f, 32f may are arranged in an odd number, respectively. In addition, as in the second modification, the inner radial grooves 42d and the outer radial grooves 42f may be arranged at irregular pitches. However, the inner radial groove 22d, 32d and the outer radial groove 22f, 32f are arranged at regular pitches in the circumferential direction of the shaft 23, and thus the non-uniform distribution of the pressure of the exhaust gas within the surfaces of the inner end surface 22b, 32b and the outer end surface 22c, 32c is suppressed, with the result that the vibration of the shaft in the axial direction can be appropriately suppressed. Furthermore, it is possible to process two grooves in one processing pass by arrangement of the grooves (the inner radial groove 22d, 32d or the outer radial groove 22f, 32f) in positions facing each other by 180 degrees as one example, with the result that it is possible to shorten the processing time.

Additionally, in the embodiment and the modifications described above, the cross-sectional shape of the grooves (the inner radial groove 22d, 32d and the outer radial groove 22f, 32f) in the direction orthogonal to the penetrating direction of the inner radial groove 22d, 32d and the outer radial groove 22f, 32f is a shape of an arc. However, the cross-sectional shape of the groove may be a shape of a semicircle, a concave shape or a shape of a letter U. However, it is possible to easily increase the cross-sectional area of the groove while reducing the depth of the groove as much as possible, by formation of the groove in a shape of an arc, and for example, by processing of the groove by using a drill whose diameter is larger than the depth of the grooves.

In addition, in the embodiment and the modifications described above, the cross-sectional area of the grooves in the direction orthogonal to the penetrating direction of the grooves (the inner radial groove 22d, 32d and the outer radial groove 22f, 32f) is larger than the area of the gap $S_2$. However, the cross-sectional area of the grooves in the direction orthogonal to the penetrating direction of the grooves may be smaller than the area of the gap $S_2$. Meanwhile, the cross-sectional area of the grooves in the direction orthogonal to the penetrating direction of the grooves is larger than the area of the gap $S_2$, and thus it is possible to stably allow the exhaust gas to flow through the grooves.

Furthermore, in the embodiment described above, as indicated by the broken lines in FIG. 7A, the inner radial groove 22d is arranged in the position in which the phase is displaced by approximately 90 degrees in the circumferential direction of the shaft 23 from the portion of the inner circumferential surface 22h with which the shaft 23 makes contact. However, the inner radial groove 22d is arranged at least outside the contact range in which the shaft 23 makes contact with the inner circumferential surface 22h of the bearing hole 22a. Meanwhile, the inner radial groove 22d is arranged in the position in which the phase is displaced by approximately 90 degrees in the circumferential direction of the shaft 23, and thus for example, when the number of inner radial grooves 22d is two, the individual inner radial grooves 22d can be separated from the contact range as much as possible.

Furthermore, in the embodiment and the modifications described above, both the inner radial groove 22d, 32d and the outer radial groove 22f, 32f are included. However, at least any one of the inner radial groove 22d, 32d and the outer radial groove 22f, 32f may be included. Meanwhile, both the inner radial groove 22d, 32d and the outer radial groove 22f, 32f are included, and thus the effect of reducing the vibration of the shaft 23 in the axial direction is synergistically enhanced.

Moreover, in the embodiment and the first modification described above, the inner radial groove 22d, 32d and the outer radial groove 22f, 32f are formed in the inner end surface 22b, 32b and the outer end surface 22c, 32c of the bearing portion 22, 32, and in the second modification described above, the inner radial groove 42d and the outer radial groove 42f are formed in the inner facing surface 44f and the outer facing surface 40c. However, the inner radial groove 22d, 32d, 42d may be provided both in the inner end surface 22b, 32b, 42b and in the inner facing surface 24f, 44f. In the same way, the outer radial groove 22f, 32f, 42f may be provided both in the outer end surface 22c, 32c, 42c and in the outer facing surface 20c, 40c.

Additionally, in the embodiment and the first modification described above, the inner radial groove 22d extends from the position of the outer circumferential surface of the bearing portion 22 in the radial direction of the shaft 23 to the position of the bearing hole 22a in the radial direction of the shaft 23. In addition, the outer radial groove 22f extends from the position of the outer circumferential surface of the bearing portion 22 in the radial direction of the shaft 23 to the position of the bearing hole 22a in the radial direction of the shaft 23. Furthermore, in the second modification, the outer radial groove 42f extends, inside the shaft 23 in the radial direction, to the fixing hole 40b, and extends, outside the shaft 23 in the radial direction, to at least the outside in the radial direction of the outer circumferential surface of the bearing portion 22. Moreover, the inner radial groove 42d extends, inside the shaft 23 in the radial direction, to the insertion hole 44c, and extends, outside the shaft 23 in the radial direction, to the outside in the radial direction of the outer circumferential surface of the bearing portion 22.

However, as long as the inner radial groove 22d, 32d, 42d and the outer radial groove 22f, 32f, 42f extend in the radial direction of the shaft 23, and a part of the exhaust gas flowing within the turbine housing 4 is allowed to flow therethrough, the position (range) and the length in the radial direction are not limited.

Furthermore, in the embodiment and the modifications described above, the outer diameter of the portion of the shaft 23 inserted into the bearing hole 22a of the bearing portion 22, 32 is larger than each of the outer diameters of the portion inserted into the fixing hole 20b, 40b of the link plate 20, 40 and the portion inserted into the insertion hole 24c, 44c of the attaching plate 24, 44. However, the diameter of the shaft 23 may be substantially constant, and the outer diameter of the portion inserted into the bearing hole 22a of the bearing portion 22, 32 may be equal to each of the outer diameters of the portion inserted into the fixing hole 20b of the link plate 20 or the fixing hole 40b and the portion inserted into the insertion hole 24c, 44c of the attaching plate 24, 44.

Although the embodiment of the present disclosure has been described above with reference to the accompanying drawings, it is needless to say that the present disclosure is not limited to such an embodiment. It is clear that a person skilled in the art would be able to conceive various variations and modifications in the scope of claims, and it is understood that they are naturally included in the technical scope of the present disclosure.

INDUSTRIAL APPLICABILITY

The present disclosure can be utilized for a turbocharger including a valve that opens and closes a flow path which is open to an internal space of a housing.

What is claimed is:

1. A turbocharger comprising:
   a turbine drivingly connected to a compressor via a rotation axis;
   a turbine housing having an internal space formed therein;
   a bearing portion provided in the turbine housing;
      wherein the bearing portion is provided with a bearing hole penetrating between an inside and an outside of the turbine housing, and includes one end of the bearing portion in a penetrating direction of the bearing hole being formed as an inner end surface located within the turbine housing;
   a shaft rotatably supported in the bearing hole, a first end of the shaft being located within the turbine housing and a second end of the shaft being located outside the turbine housing;
   an attaching plate including an inner facing surface facing the inner end surface of the bearing portion in an axial direction of the shaft, the attaching plate being fixed to the shaft protruding from the bearing portion; and
   a valve coupled to the shaft through the attaching plate, the valve configured to open and close a flow path opened to the internal space along with rotation of the shaft,
   wherein an inner radial groove is formed in at least one of the inner end surface and the inner facing surface, and
   wherein the inner radial groove extends in a radial direction of the shaft to allow a part of a fluid flowing within the turbine housing to flow therethrough.

2. The turbocharger according to claim 1, further comprising:
   a link plate configured to be swung around the shaft as a rotation axis by power of an actuator, the link plate including an outer facing surface provided outside the turbine housing, the outer facing surface being fixed to the shaft and facing an outer end surface of the bearing portion in the axial direction of the shaft,
   wherein another end of the bearing portion in the penetrating direction of the bearing hole is the outer end surface located outside the turbine housing,
   wherein an outer radial groove is formed in at least one of the outer end surface and the outer facing surface, and
   wherein the outer radial groove extends in the radial direction of the shaft to allow a part of the fluid flowing within the turbine housing to flow therethrough.

3. The turbocharger according to claim 2,
   wherein the inner radial groove is arranged, in a circumferential direction of the inner end surface, outside a contact range in which the shaft makes contact with an inner circumferential surface of the bearing hole by pressing force acting on the valve from the fluid flowing through the flow path.

4. The turbocharger according to claim 3,
   wherein the outer radial groove is arranged, in a circumferential direction of the outer end surface, outside a contact range in which the shaft makes contact with the inner circumferential surface of the bearing hole by the power from the actuator acting on the link plate.

5. The turbocharger according to claim 2,
   wherein the outer radial groove is arranged, in a circumferential direction of the outer end surface, outside a contact range in which the shaft makes contact with the inner circumferential surface of the bearing hole by the power from the actuator acting on the link plate.

6. The turbocharger according to claim 1,
   wherein the inner radial groove is arranged, in a circumferential direction of the inner end surface, outside a contact range in which the shaft makes contact with an inner circumferential surface of the bearing hole by pressing force acting on the valve from the fluid flowing through the flow path.

7. The turbocharger according to claim 6,
   wherein the outer radial groove is arranged, in a circumferential direction of the outer end surface, outside a contact range in which the shaft makes contact with the inner circumferential surface of the bearing hole by the power from the actuator acting on the link plate.

8. A turbocharger comprising:
a turbine drivingly connected to a compressor via a rotation axis;
a turbine housing having an internal space formed therein;
a bearing portion provided in the turbine housing,
  wherein the bearing portion is provided with a bearing hole penetrating between an inside and an outside of the turbine housing, one end of the bearing portion in a penetrating direction being formed as an outer end surface located outside the turbine housing;
a shaft rotatably supported in the bearing hole, a first end of the shaft being located outside the turbine housing and a second end of the shaft being located within the turbine housing;
a valve coupled to the shaft, the valve configured to open and close a flow path opened to the internal space along with rotation of the shaft; and
a link plate configured to be swung around the shaft as a rotation axis by power of an actuator, the link plate including an outer facing surface provided outside the turbine housing, the outer facing surface being fixed to the shaft and facing the outer end surface of the bearing portion in the axial direction of the shaft,
wherein an outer radial groove is formed in at least one of the outer end surface and the outer facing surface, and
wherein the outer radial groove extends in a radial direction of the shaft to allow a part of a fluid flowing within the turbine housing to flow therethrough.

9. The turbocharger according to claim 8,
wherein the outer radial groove is arranged, in a circumferential direction of the outer end surface, outside a contact range in which the shaft makes contact with the inner circumferential surface of the bearing hole by the power from the actuator acting on the link plate.

* * * * *